US010129411B1

(12) United States Patent
Delker

(10) Patent No.: US 10,129,411 B1
(45) Date of Patent: Nov. 13, 2018

(54) SYSTEM AND METHOD OF ENHANCING A MOBILE DEVICE UPGRADE OFFER

(71) Applicant: Sprint Communications Company L.P., Overland Park, KS (US)

(72) Inventor: Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 742 days.

(21) Appl. No.: 14/203,483

(22) Filed: Mar. 10, 2014

(51) Int. Cl.
*G06Q 30/00* (2012.01)
*H04M 15/00* (2006.01)

(52) U.S. Cl.
CPC .......... *H04M 15/42* (2013.01); *H04M 15/58* (2013.01); *H04M 15/725* (2013.01)

(58) Field of Classification Search
CPC . G06Q 10/30; G06Q 30/0635; H04M 1/0287; H04W 4/00
See application file for complete search history.

(56) References Cited

U.S. PATENT DOCUMENTS

| | | | | |
|---|---|---|---|---|
| 7,986,935 B1* | 7/2011 | D'Souza | ................. | G06Q 30/02 379/114.02 |
| 2007/0124367 A1* | 5/2007 | Fan | ..................... | G06F 11/0742 709/203 |
| 2010/0228676 A1* | 9/2010 | Librizzi | ................. | G06Q 10/00 705/306 |
| 2013/0103749 A1* | 4/2013 | Werth | ................... | G06F 9/4446 709/203 |
| 2013/0246212 A1* | 9/2013 | Sullivan | ............. | G06Q 30/0611 705/26.4 |
| 2015/0235270 A1* | 8/2015 | Partida | ............... | G06Q 30/0267 705/14.64 |

OTHER PUBLICATIONS

Steele, B. How to Activate a New Phone on an Existing Verizon Account, May 11, 2013, Demand Media, http://smallbusiness.chron.com/activate-new-phone-existing-verizon-account-56058.html, 5pp (Year: 2013).*

* cited by examiner

*Primary Examiner* — Michael W Schmucker

(57) ABSTRACT

In an embodiment, a system comprises an application that is configured to identify features of a current mobile service plan associated with a current mobile device, wherein the features of the current mobile service plan comprises at least an amount of time remaining on a current mobile service plan contract, identify different mobile devices, wherein identifying the different mobile devices comprises identifying a retail price for each of the different mobile devices generate an available price for each of the different mobile devices based on at least the features of the current mobile service plan associated with the current mobile device and the retail price for each of the different mobile devices, and to provide the generated available price for each of the different mobile devices to a user associated with the current mobile device.

15 Claims, 7 Drawing Sheets

SYSTEM AND METHOD OF ENHANCING A MOBILE DEVICE UPGRADE OFFER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may obtain network connectivity through base stations with one or more service networks. New mobile devices are frequently brought to market with new features and capabilities in order to entice consumers to purchase them.

SUMMARY

In an embodiment, a system for providing a mobile device pricing offer is disclosed. The system comprises a processor and a memory. The system further comprises an application stored in the memory that, when executed by the processor configures the processor to (a) identify one or more features of a current mobile service plan associated with a current mobile device, wherein the one or more features of the current mobile service plan comprises at least an amount of time remaining on a current mobile service plan contract or (b) identify one or more features of the current mobile device or (c) evaluate a usage history of the user of the current mobile device. The application further is configured to identify one or more different mobile devices, wherein identifying the one or more different mobile devices comprises identifying a retail price for each of the one or more different mobile devices and to generate an available price for each of the one or more different mobile devices based on (a) at least the one or more features of the current mobile service plan associated with the current mobile device or (b) the identified one or more features of the current mobile device or (c) the evaluation of the usage history of the user and based on the retail price for each of the one or more different mobile devices. The application is further configured to provide the generated available price for each of the one or more different mobile devices to a user associated with the current mobile device.

In an embodiment, a method providing a mobile device pricing offer is disclosed. The method comprises identifying, by an application, one or more features of a current mobile service plan associated with a current mobile device, wherein the one or more features of the current mobile service plan comprises at least an amount of time remaining on a current mobile service plan contract, and wherein the application is stored in a memory and executed by a processor. The method further comprises identifying, by the application, one or more different mobile devices, wherein identifying the one or more different mobile devices comprises identifying a retail price for each of the one or more different mobile devices. The method further comprises generating, by the application, an available price for each of the one or more different mobile devices based on at least the one or more features of the current mobile service plan and the retail price for each of the one or more different mobile devices. The method further comprises providing, by the application, the generated available price for each of the one or more different mobile devices to a user associated with the current mobile device.

In an embodiment, a method transferring mobile service between mobile devices is disclosed. The method comprises receiving, by a mobile device, one or more account identification items associated with a mobile service account. The method further comprises transmitting, by the mobile device, the one or more account information items to a server. The method further comprises receiving, by the mobile device, activation of mobile service associated with the mobile service account in response to transmitting the one or more account information items.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
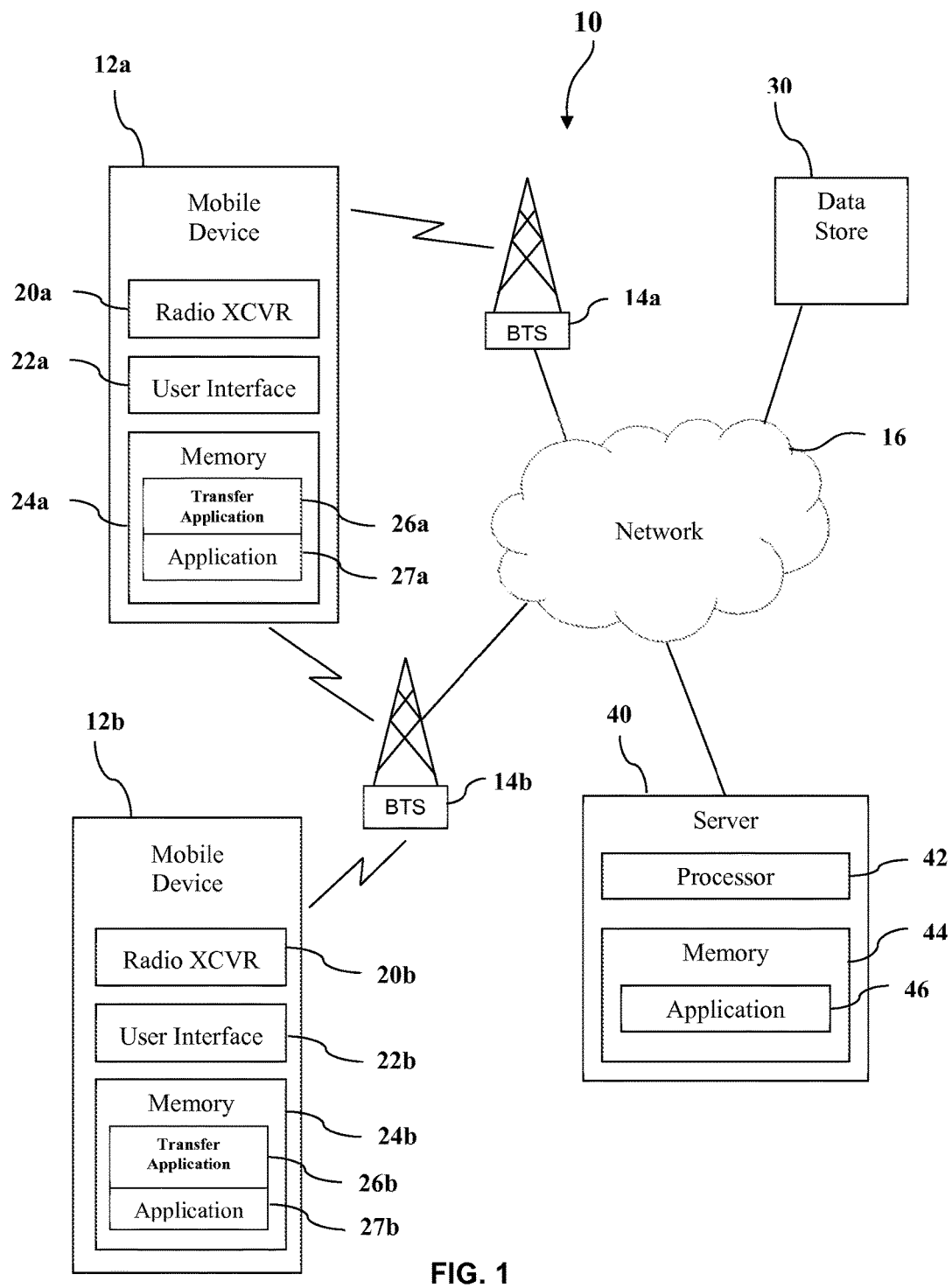
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, the system may provide a mobile device owner with the opportunity to purchase a different and possibly an upgraded mobile device at a price different from the retail price (e.g. an available price), such as a discounted price, at any time during the mobile service plan contract term. The discounted price may take into account a refurbished value and/or resale value of the current mobile device. The discounted price may take into account a customer value based on loyalty of the customer, number of devices associated with the customer, a level of value added service consumption of the customer, and other customer related factors. The discounted price may take into account a remaining wireless communication service contract term.

An upgraded mobile device may comprise at least one feature different from the features of the current mobile device (e.g. the mobile device currently owned and/or used by a user and/or subscriber). For example, an upgraded mobile device may comprise the same make and/or model as a current mobile device, but has at least one feature and/or component such as an improved camera and/or a different shaped screen which is different from the current mobile device. As another example, an upgraded mobile device may be a different make and/or model, for example a next generation model of a mobile device. As the amount of time decreases that a mobile device owner is obligated to pay for mobile service under a current mobile service plan contract, incentives, such as decreasing the available price for a different and/or upgraded mobile device may increase. Based on the amount of time left under a current mobile communication service plan contract, a mobile communication service provider may incrementally subsidize the cost of an updated mobile device to incentivize a mobile communication service user to renew his or her mobile service contract before that mobile service contract expires. In an embodiment, the cost of an updated mobile device may also be subsidized based on the value of the current mobile device as a refurbished device, the amount of revenue generated by the current mobile service plan, a mobile device usage history, the amount of additional revenue generated by purchase of the upgraded mobile device, and/or the like. In some contexts, a mobile communication service plan contract may be referred to as a mobile service plan contract or a service plan contract.

The system also provides for transferring mobile service from a current mobile device to a different mobile device by entering in one or more mobile service account identification items to fields in a display and transmitting a signal through a transfer application stored in the different mobile device. By receiving a selection and transmitting a delivery request, the application may provide quick, convenient, and hassle-free mobile device changes and/or upgrades between a current or initial mobile device and different or subsequent mobile device. A mobile device owner and/or user may, for example, upgrade the current mobile device to a different mobile device without having to interact with a customer service representative and/or go to a mobile device retail store to activate a different mobile device.

Turning now to FIG. 1, a communication system 10 is described. The system 10 may comprise one or more mobile devices 12*a* and/or 12*b*, base transceiver stations (BTS) 14*a* and 14*b*, a network 16, a data store 30, and a server 40. In an embodiment, the server 40 may be configured to store one or more applications 46 which function to provide a mobile device offer. For example, the server 40 may store an application 46 which identifies one or more features of a current mobile service plan associated with a particular mobile device 12*a* and/or 12*b*. Based on the one or more features of the current mobile service plan associated with the particular mobile device 12*a* and/or 12*b*, the application 46 may provide an available price for different mobile devices 12*a* and/or 12*b*. While the application 46, illustrated in FIG. 1, is stored within the memory 44 of the server 40, it is understood that the application 46 may be stored in the memory 24 of the mobile device 12. Additionally, while one application 46 is illustrated in FIG. 1, it is understood that the communication system 10 may comprise two or more applications 46 stored in the memory 44 of the server 40 and/or the memory 24 of the mobile device 12. In an embodiment, the application 46 may be configured to access information about a particular mobile service plan associated with a particular mobile device 12*a* and/or 12*b*, one or more mobile device users associated with a particular mobile device 12*a* and/or 12*b*, and/or information about a particular mobile device 12*a* and/or 12*b*, which will be disclosed in more detail herein.

The mobile device 12*a* and/or 12*b* may be a mobile phone, a personal digital assistant (PDA), a media player, or other communication enabled portable electronic device. In an embodiment, the mobile device 12*a* and/or 12*b* may be implemented as a handset. Details of handsets are discussed further hereinafter. The base transceiver stations 14*a* and 14*b* provide a wireless communication link to the mobile device 12*a* and/or 12*b* and couples the mobile device 12*a* and/or 12*b* to the network 16. In an embodiment, the base transceiver stations 14*a* and 14*b* provide wireless communication links to the mobile device 12*a* and/or 12*b* according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14*a* and 14*b* are illustrated in FIG. 1, it is understood that the communication system 10 may comprise two or more base transceiver stations 14 and any number of mobile devices 12*a* and/or 12*b*. The network 16 may be a public communication network, a private communication network, or a combination thereof.

The mobile device 12*a* and/or 12*b* may comprise a radio transceiver 20*a* and/or 20*b*, a user interface 22*a* and/or 22*b*, and a memory 24*a* and/or 24*b*. Alternatively, the mobile device 12 may comprise two or more radio transceivers 20*a* and/or 20*b*. In an embodiment, the mobile device 12*a* and/or 12*b* may comprise one or more applications 26*a*, 27*a* and/or 26*b*, 27*b*. As will be discussed further herein, the application 26*a* and/or 26*b* (e.g. transfer application 26*a* and/or 26*b*) may be configured to transfer mobile service, for example, from a current mobile device 12*a* to a different mobile device 12*b*. The server 40 may comprise a processor 42, a memory 44, and an application 46 stored in the memory 44. The server 40 may also comprise a plurality of processors located in a plurality of computers. Computers are discussed in more detail hereinafter.

The application 46, when executed by the processor 42 of the server 40, may be configured to provide a mobile device owner, owning a current mobile device 12*a*, an available price for each different mobile device 12*b* of one or more different mobile devices 12*b* based on one or more features of a current mobile service plan associated with the current mobile device 12*a* and a retail price for each different mobile device 12*b* of the one or more different mobile devices 12*b*. In an embodiment, the application 46 may be initiated when the application 46 receives a triggering message. The triggering message may be sent in response to receiving a notification indicating that a user associated with the current mobile device 12*a* is viewing a list of one or more different mobile devices 12*a* and/or 12*b* for sale. For example, an owner of an Apple iPhone 4S may be interested in changing to a different mobile device 12*b*, such as an Apple iPhone 5 or an Android. The owner may access a personal account, for example, via a secured web page of a mobile service provider, such as Sprint, and look at a list of one or more different mobile devices 12*b*. Upon accessing the list of the one or more different mobile devices 12*b*, a triggering message may be sent from a server associated with the web page and received by the application 46 initiating the application 46.

In an embodiment, the owner may access a list of one or more different mobile devices 12*b* for sale through their current mobile device 12*a*. A server associated with a service provider providing mobile service on the current mobile device 12*a* may identify that the list of one or more different mobile devices 12*b* for sale was accessed and send a triggering message to the application 46. In an embodiment, an application stored in the memory of the current mobile device 12*a* may identify the access of the list of one or more different mobile devices 12*b* for sale through the current mobile device 12*a* and send a triggering message to the application 46.

In an embodiment, the triggering message may be sent in response to a current date matching one or more specified times and/or dates, a time of year (e.g. fall, holiday season, high school and/or college graduation, etc.), a history of previous mobile device purchases, the release of one or more new mobile devices, the amount of time through mobile service plan contract, and/or the like. For example, Samsung may have released their latest Galaxy smart phone. Upon release of the latest Galaxy smart phone, a trigger message may be sent by a server associated with a current service provider of a current mobile device 12*a* and received by the application 46 thereby initiating the application 46.

In an embodiment, one or more specified times may be based on information about one or more other users associated with the owner's current mobile service plan. For example, an owner associated with a current mobile service plan may have a daughter who is about to turn 18 and head to college. The daughter may currently have an inexpensive current mobile device 12*a*, for example without the capability of data service (e.g. accessing web pages, downloading applications, and/or the like), which may be on the owner's current mobile service plan. The owner may wish to give the daughter a different mobile device 12*b* with data service for her 18*th* birthday and/or before she goes to college. The daughter may be listed on the owner's current mobile service plan account as a dependent, identifying her name, age, birthdate, and/or the like. Around the time of the daughter's 18*th* birthday, for example, a few weeks before her birthday, a triggering message may be sent and received by the application 46 thereby initiating the application 46. In an embodiment, the triggering event may comprise one or more specified dates through the current mobile service plan contract term. For example, the trigger event may be 3 months from the end of the current mobile service plan contract expiration.

In an embodiment, the application 46 may be initiated to provide to an owner of a current mobile device 12*a* utilizing a current mobile service plan and/or one or more other users associated with one or more other current mobile devices 12*a* of the owner's current mobile service plan an available price for each different mobile device 12*b* of one or more different devices 12*b*. For example, the application 46 may be initiated to provide available prices for each different mobile device 12*b* of one or more different mobile devices 12*b* only to the owner of the current mobile service plan, even though the owner's current service plan may also be used by other users with other current mobile devices 12*a*, such as the owner's 18 year old daughter. The application 46 may be initiated to provide one or more available prices for each different mobile device 12*b* of one or more different mobile devices 12*b* to everyone receiving mobile service through a particular mobile service provider, for example, the triggering event is a particular time of year, such as December.

In an embodiment, the application 46 may be configured to identify one or more features of a current mobile service plan associated with a current mobile device 12*a*, wherein the one or more features of the current mobile service plan comprises at least an amount of time remaining on a current mobile service plan contract. For example, the application 46 may identify the current mobile device 12*a* and access a data store 30 which stores information about the current mobile device 12*a* comprising information about the current mobile service plan associated with the current mobile device 12*a* and one or more features of the current mobile service plan.

Identifying one or more features of a current service plan may provide an estimate about how much the remainder of a contract associated with a current service plan is worth. For example, a mobile device owner may have purchased a current mobile device 12*a* last month and agreed to a current mobile service contract with a two year term. Thus, the owner is obligated under the current mobile service contract to pay for mobile service for 23 more months. The application 46 may subtract a value from the retail price of a different mobile device 12*b* based on the remaining months of contract life in order to generate an available price for the different mobile device 12*b*, as will be discussed further herein.

In an embodiment, the application 46 may be configured to identify one or more different mobile devices 12*b*, wherein identifying the one or more different mobile devices 12*b* may comprise identifying a retail price for each of the one or more different mobile devices. A retail price may comprise at least one of, the purchase price of a different mobile device 12*b* if the mobile device 12*b* was purchased without buying a mobile service plan or a non-discounted price for a mobile device 12*b*. The application 46 may identify one or more different mobile devices 12*b* based on a current mobile device 12*a*. For example, the application 46 may detect that a mobile device owner and/or user has logged into a mobile service provider's webpage with a personal username and password. After logging in, the mobile device owner may begin browsing through different mobile devices 12*b* on the mobile service provider's website. The application 46 may identify one or more current mobile devices 12*a* from the account logged into by the mobile device owner. Based on the identified one or more current mobile devices 12*a*, the application 46 may identify one or more different mobile devices 12*b* in order to provider a mobile device pricing offer. Alternatively, a mobile device owner and/or user may access a website depicting one or more different mobile devices 12*b*. In response to accessing the website, a mobile service provider associated with the website may display a username and log-in window and prompt the mobile device owner and/or user to enter a username and password so that the application 46 may identify one or more different mobile devices 12*b* to provide a mobile device pricing offer.

The application 46 may identify one or more different mobile devices 12*b* based on the current mobile device 12*a* used when browsing one or more different mobile devices 12*b*. For example, a mobile device owner may be using his tablet to browse different mobile devices 12*b*. The application 46 may identify the use of the tablet and identify one or more different mobile device 12*b*, such as one or more different tablets and/or one or more mobile devices of the same and/or similar make, the same and/or similar model, the same and/or similar manufacturer, the same and/or similar brand, and/or the like.

The application 46 may identify that a particular current mobile device 12a is being used to browse one or more different mobile devices 12b by obtaining a unique identifier associated with the particular current mobile device 12a. In an embodiment, a unique identifier may comprise a unique string of characters assigned to each mobile device 12a and/or 12b ever manufactured. Because mobile devices 12a and/or 12b may use different technologies, unique identifiers may be expressed in a variety of formats. For example, mobile devices 12a and/or 12b manufactured to use the code division multiple access (CDMA) technology receive a unique identifier called a mobile equipment identifier (MEID). The unique identifier for mobile devices 12a and/or 12b manufactured with the global system for mobile communications (GSM) or universal mobile telecommunications system (UMTS) technologies is called an international mobile subscriber identity (IMSI). Mobile devices 12a and/or 12b manufactured using the integrated digital enhanced network (iDEN) technology receive a unique identifier called an international mobile equipment identity (IMEI). Using these technologies, the unique identifiers are associated with the hardware of the mobile devices 12a and/or 12b and the unique identifiers do not normally change. In an embodiment, some mobile devices 12a and/or 12b may be assigned unique identifiers by the wireless service providers selling the mobile devices 12a and/or 12b and for purposes of the discussion of the present disclosure, these assigned unique identifiers are recognized and used by the components of the system 10, such as the application 46. Unique identifiers are typically provided in origination messages to establish voice and/or data calls and/or sessions. One of ordinary skill in the art may appreciate one or more ways that the application 46 may obtain a unique identifier of a particular mobile device being used to browse, for example, a website.

It should be understood that a current mobile device 12a and a different mobile device 12b may comprise the same and/or different make, the same and/or different model, the same and/or different manufacturer, the same and/or different version, the same and/or different color, and/or the like. Thus, the different mobile device 12b comprises a mobile device which is not the current mobile device 12a currently used by a mobile device owner and/or mobile device user. For example, a mobile device owner's current mobile device 12a may be a white iPhone 4S. The mobile device owner may be looking for another white iPhone 4S because the mobile device owner's current white iPhone 4S has a cracked but functional screen. A new white iPhone 4S without a cracked screen may be a different mobile device 12b from the current mobile device 12a, the white iPhone 4S with a cracked screen, even though the current mobile device 12a and the different mobile device 12b are the same make, model, manufacturer, version, and color mobile device.

In an embodiment, the application 46 may generate an available price for each of the one or more different mobile devices 12b based on at least the one or more features of the current mobile device plan associated with the current mobile device 12a and the retail price for each of the one or more different mobile devices 12b. For example, a first mobile device owner may have purchased a current mobile device 12a and agreed to a current mobile service contract with a three year term four months earlier. Thus, the first mobile device owner is obligated under the current mobile service contract to pay for mobile service for 32 more months. Furthermore, a second mobile device owner may have purchased a current mobile device 12a and agreed to a current mobile service contract with a one year term three months earlier. Thus, the second mobile device owner is obligated under the current mobile service contract to pay for mobile service for 9 more months.

The application 46 may identify one or more features of the first mobile device owner's current mobile service plan comprising the amount of time remaining on the current mobile service plan contract, identify one or more different mobile devices 12b comprising at least the retail price for each of the one or more different mobile devices 12b, and generate an available price for each of the one or more different mobile devices 12b based on at least the one or more features of the current mobile service plan associated with the first mobile device owner's current mobile device 12a and the retail price for each of the one or more different mobile device 12b. For example, the application 46 may identify three different mobile devices 12b. The first different mobile device 12b may have a retail price of $400. The second different mobile device 12b may have a retail price of $300. The third different mobile device 12b may have a retail price of $200.

The application 46 may generate an available price for each of the different mobile devices 12b based on at least the amount of time remaining on the first mobile device owner's current service plan contract. For example, the application 46 may determine that because the first mobile device owner is obligated for 32 remaining months under his current mobile service contract that the first different mobile device 12b has an available price of $370, the second different mobile device 12b has an available price of $285, and the third different mobile device 12b has an available price of $150.

Furthermore, the application 46 may identify one or more features of the second mobile device owner's current mobile service plan comprising the amount of time remaining on the current mobile service plan contract, identify one or more different mobile devices 12b comprising at least the retail price for each of the one or more different mobile devices 12b, and generate an available price for each of the one or more different mobile devices 12b based on at least the one or more features of the current mobile service plan associated with the second mobile device owner's current mobile device 12a and the retail price for each of the one or more different mobile device 12b. For example, the application 46 may have identified the same three different mobile devices 12b that were identified for the first mobile device owner. The application 46 may generate an available price for each of the different mobile devices 12b based on at least the amount of time remaining on the second mobile device owner's current service plan contract. For example, the application 46 may determine that because the second mobile device owner is obligated for 10 remaining months under his current mobile service contract that the first different mobile device 12b has an available price of $200, the second different mobile device 12b has an available price of $105, and the third different mobile device 12b has an available price of $70.

Upon generating an available price for each of the one or more different mobile devices 12b, the application 46 may provide the generated available price(s) to a user of a current mobile device 12a, such as the current mobile device owner. The application 46 may provide the generated available price(s) to an email address associated with a mobile service account, to a display on the current mobile device 12a, via a text message and/or a data message to the current mobile device 12a, to one or more other mobile devices of a user associated with a mobile device owner and/or the current mobile device 12a, to a server associated with mobile service provider and/or available for access by a mobile device user, and/or directly to the page (e.g. a webpage) comprising the different mobile devices 12b and each of their retail prices. For example, the mobile device owner may have logged into his mobile service provider account through the mobile service provider's webpage. The mobile device owner may be browsing through a list of one or more different mobile devices 12b selected by the mobile device owner. The application 46 may be able to provide an available price for each of the one or more different mobile devices 12b on the webpage as the mobile device owner browses the webpage.

The system 10 provides a mobile device owner with the opportunity to purchase a different and possibly an upgraded mobile device at a price different from the retail price (i.e. an available price), such as a discounted price, at any time during the mobile service plan contract term. As the amount of time decreases that a mobile device owner is obligated to pay for mobile service under a current mobile service plan contract, incentives, such as a decreasing available price for a different and/or upgraded mobile device, generated by the application 46, may increase. For example, because the first mobile device owner had 32 months remaining on his current mobile service plan contract, the first, second, and third different mobile devices 12b were generated at a higher available price than for the second mobile device owner.

As previously discussed, one or more features of a current mobile service plan associated with a current mobile device 12a may comprise at least amount of time remaining on a current mobile service plan contract. In an embodiment, the one or more features of a current mobile service plan associated with a current mobile device 12a may also comprise a total current mobile service plan contract duration, a quantity of talk minutes available per month on the current mobile service plan, a number of other mobile devices associated with the current mobile service plan, a revenue generated through the current mobile service plan, a quantity of data permitted for data transmission per month with a current mobile service plan, and/or the like. For example, the application 46 may identify the current mobile device 12a and access a data store 30 which stores information about the current mobile device 12a comprising information about the current mobile service plan associated with the current mobile device 12a and one or more features of the current mobile service plan.

The one or more features of the current mobile service plan may comprise an amount of revenue generated through the current mobile service plan, such as the remainder of the current service plan. For example, the mobile device owner may have 23 months remaining on his current mobile service plan contract. The mobile device owner may have agreed to a service plan comprising a data plan and international calling, obligating the mobile device owner to pay $200 per month under the current mobile service contract for mobile service for the mobile device owner's current mobile device 12a. Furthermore, the mobile device owner may also have one or more other current mobile devices 12a under the same mobile service contract and/or another mobile service contract obligating the mobile device owner to pay an additional $200 per month for the same remaining time period. Based on the one or more features of the current mobile service plans, the remainder of the contract(s) of the current service plan(s) may be worth an estimated $9200 (($200/mo.+$200/mo.)×23 remaining months). The application 46 may assign a weight to the value of the remainder of the contract of the current mobile service plan based on the amount of time remaining in the current mobile service plan contract to generate a weighted value. The weighted value may be subtracted from the retail value of a different mobile device 12b in order to generate and provide an available price of the different mobile device 12b.

In an embodiment, the application 46 may identify one or more features of the current mobile device 12a and generate the available price for each of the one or more different mobile devices 12b based on at least the one or more features of the current mobile device 12a. One or more features of the current mobile device 12a may comprise at least one of a current mobile device age, a current mobile device type, a current mobile device model, a previous purchase price of the current mobile device 12a, a current functionality of the current mobile device 12a, a damage history of the current mobile device 12a, one or more service requests associated with the current mobile device 12a, and/or the like. For example, the application may generate an available price for each of the one or more different mobile devices 12b based on the trade-in value of the current mobile device 12a. Before generating an available price, the application 46 may provide a list of questions to the mobile device owner to answer pertaining to the current condition of the current mobile device 12a. The application 46 may access data store 30 to identify any past service requests, damage reports, previous repairs, and/or the like associated with the current mobile device 12a. The application 46 may access data store 30 to identify when the current mobile device 12a was purchased, if the current mobile device 12a had one or more previous owners, the make, model, type, class, and/or brand of the current mobile device 12a. A current mobile device 12a returned and/or provided to the mobile wireless service provider in exchange for a different mobile device price subsidy for a different mobile device 12b may be refurbished and sold by the mobile service provider to another mobile service user. The value of a returned mobile device 12a may depend on the age, the model, and the condition of the device. This value of the current mobile device 12a as a refurbished device may be taken into consideration in pricing the different mobile devices 12b, for example the refurbished device value lowering the purchase price of the different mobile devices 12b.

In an embodiment, the application 46 may access an application 27a stored in the memory 24a of the current the mobile device 12a. Application 27a may be configured to run a diagnostics check on the current mobile device 12a. For example, application 46 may use the value of the current mobile device 12a in order to generate and provide an available price of a different mobile device 12b. The application 46 may send a signal to the current mobile device 12a which triggers the function of the application 27a to run a diagnostics test on the current mobile device 12a. The application 27a may identify one or more stress sensors placed at one or more locations within the mobile device 12a which may determine if the current mobile device 12a has been tampered with and/or handled frequently with less than good care. The application 27a may examine the battery life (e.g., the time before the battery becomes obsolete or is no longer serviceable) of the current mobile device 12a, the processing capability of one or more processors, whether one or more viruses are present in the current mobile device 12a, the function of the current mobile device display and/or inputs (e.g. keys) of the current mobile device 12a, the microphone and speaker quality, and/or the like. The application 27a may then transmit a message to the application 46 which the application 46 may use to generate an available price for one or more different mobile devices 12b.

In an embodiment, the application 46 may identify a usage history of the user of the current mobile device 12a and generate an available price for each of the one or more different mobile devices 12b based on at least the usage history of the user of the current mobile device 12a. In an embodiment, usage history may comprise at least one of a duration of time receiving service from a mobile service provider associated with the current mobile service plan, an amount of revenue generated from mobile service usage by the current mobile device 12a, a number of other mobile devices associated with the user of the current mobile device, or a number of mobile service plan contract renewals with the mobile service provider by the user of the current mobile device. For example, a mobile device owner may have been a customer of the same service provider for 10 years. During that time, the mobile device owner may have signed three service contracts of 2 years, 3 years, and 5 years respectively. The application 46 may access a data store 30 and identify the usage history associated with the mobile device owner. Based on the amount of time the mobile device owner has been using the particular service provider and/or based on the duration of time the mobile device owner was willing to be under contract (e.g. a six year mobile service plan contract) the application 46 may determine a loyalty and/or a likelihood that the mobile device owner would not renew their mobile service plan contract when the current mobile service plan contract expired. Thus, application 46 may then assign a value based on loyalty and/or a likelihood that the mobile device owner would not renew their mobile service plan contract when the current mobile service plan contract expired and subtract that value from a retail price of a different mobile device 12b to generate and provide an available price for the different mobile device 12b.

In an embodiment, the application 46 may generate an available price for each of the one or more different mobile devices 12b based on one or more different service plans associated with the one or more different mobile device 12b. Service plans may have varying terms (e.g. durations), data usage limits, international call minute limits, text messaging limits, mobile voice minute limits, and/or the like. For example, one or more different mobile devices 12b may have different mobile service plan contract terms (e.g. durations) associated with them. For example, a different mobile device 12b may have a mobile service plan contract term of 1 year, 2 years, and 3 years. The application 46 may assign a value based on the length of the mobile service plan contract. The application 46 may then subtract that value from the retail price of a different mobile device 12b to generate and provide an available price of the different mobile device 12b. In an embodiment, service plans may only be provided for particular different mobile devices 12b. For example, some different mobile devices 12b may not have data capabilities and thus service plans which include data plans may not be provided for those different mobile devices 12b. The application 46 may assign a value based on particular service plans and subtract that value from the retail price of a different mobile device 12b to generate and provide an available price of the different mobile device 12b.

In an embodiment, the application 46 may receive a selection of at least one of the one or more different mobile devices 12b in response to providing the generated available price of each of the one or more different mobile devices 12b to a mobile device owner and/or user associated with the current mobile device 12a. For example, the application may provide three different mobile devices 12b with three different available prices, one for each different mobile device 12b: a first different mobile device 12b may be provided with an available price of $100, a second different mobile device 12b may be provided with an available price of $150, and a third different mobile device 12b may be provided with an available price of $175. A mobile device owner and/or user may select at least one of the three different mobile devices 12b from a selection menu on a computer screen, a mobile device display, and/or the like. The application 46 may receive the selection and transmit a request to a server to initiate delivery of at least the selected different mobile device(s) 12b. The selected different mobile devices 12b may then be shipped directly to an address associated with the mobile device owner and/or user, a mobile device retail store of a mobile device owner and/or user's choosing, and/or the like.

In an embodiment, at least the different mobile device(s) 12b may comprise a transfer application 26b. The transfer application 26b is configured to activate mobile service on the different mobile device 12b. For example, upon delivery of a different mobile device 12b, the mobile device owner and/or user may want to activate mobile service on the different mobile device 12b through the mobile device owner and/or user's mobile service plan. The mobile device owner and/or user may power on the different mobile device 12b. In response to powering on the different mobile device 12b, the transfer application 26b may activate and provide an activation window on the display of the different mobile device 12b. The display may prompt the user to provide the input of one or more account information items associated with the mobile device owner and/or user's mobile service plan account into fields on the display. The display may require an input of an account identification number, an account username, an account password, the phone number of the current mobile device 12a, a unique identifier associated with only the different mobile device 12b, an address of the mobile device owner and/or user, an answer to one or more security questions, and/or the like. Upon receiving the one or more account information items, the transfer application 26b may transmit this information to the application 46 and/or another server associated with mobile service and/or mobile service plans so that the different mobile device 12b may receive mobile service through the mobile service plan associated with mobile device owner and/or user. For example, the different mobile device 12b may receive an activation signal activating mobile service associated with the mobile service account in response to transmitting the one or more account information items.

In an embodiment, in response to entering one or more account information items into the display, the application 46 may transmit a signal which deactivates a current mobile device 12a which was previously receiving mobile service through an account associated with the mobile device owner and/or user. For example, the display may require the input of the current mobile device's telephone and/or a unique identifier associated with only the current mobile device 12a. Thus, when the transfer application 26b transmits the one or more account information items to a server, the server may identify which current mobile device 12a (e.g. which mobile device currently receiving mobile service) is to be deactivated and thus should no longer receive mobile service.

In an embodiment, the mobile service deactivated on the current mobile device 12a may be on the same mobile service contract plan as the activated mobile service on the different mobile device 12b. For example, a mobile device owner may have received a different mobile device 12b, such as an upgraded mobile device, comprising the transfer application 26b, the mobile device owner may want and/or may be asked to remain on the same mobile service plan contract even though the mobile device owner is going to change mobile devices from a current mobile device 12a to a different mobile device 12b. Thus, when mobile service is moved from the current mobile device 12a to the different mobile device 12b, the mobile service is still under the same mobile service plan contract.

In an embodiment, the mobile service deactivated on the current mobile device 12a may be through a different (e.g. a new and/or another) mobile service plan contract than the activated mobile service on the different mobile device 12b. For example, a mobile device owner may have received a different mobile device 12b, such as an upgraded mobile device, for a discounted price in exchange for signing a new mobile service plan contract agreement that extends for a term beyond the mobile device owner's current mobile service plan contract expiration. Similar to the previous embodiment, the different mobile device 12b may comprise the transfer application 26b. Thus, when mobile service is moved from the current mobile device 12a to the different mobile device 12b, the mobile service receives mobile service under the new mobile service plan contract. In an embodiment, the mobile device owner is relieved from further obligation under the previous (e.g. current) mobile service plan contract.

By receiving a selection and transmitting a delivery request, the transfer application 26b may provide quick, convenient, and hassle-free mobile device changes and/or upgrades between a current or initial mobile device and different or subsequent mobile device. In an embodiment, receiving a selection and transmitting a delivery request and/or order fulfillment request may be carried-out in conjunction with a sale of the different mobile device 12b. For example, a current mobile device owner may select a mobile device and the application 46 may receive the selection and transmit the delivery request and/or order fulfillment request for a different mobile device 12b in response to the mobile device owner providing payment information and authorizing the purchase of the different mobile device 12b through the payment information. Payment information may comprise a credit card number and/or information, a bank account number and/or information, pay account information, and/or the like. Alternatively, cash and/or a check may be used in lieu of payment information. In an embodiment, receiving a selection and transmitting a delivery and/or order fulfillment request may be carried-out in conjunction with the shipment of the current mobile device 12a by the current mobile device owner. For example, the application 46 may transmit a delivery and/or order fulfillment request in response to receiving the current mobile device 12a, where the value of the current mobile device 12a is used to subsidize the price of a different mobile device 12b. A mobile device owner and/or user may, for example, upgrade the current mobile device 12a to a different mobile device 12b without having to interact with a customer service representative and/or go to a mobile device retail store to activate a different mobile device 12b.

Figure 2:
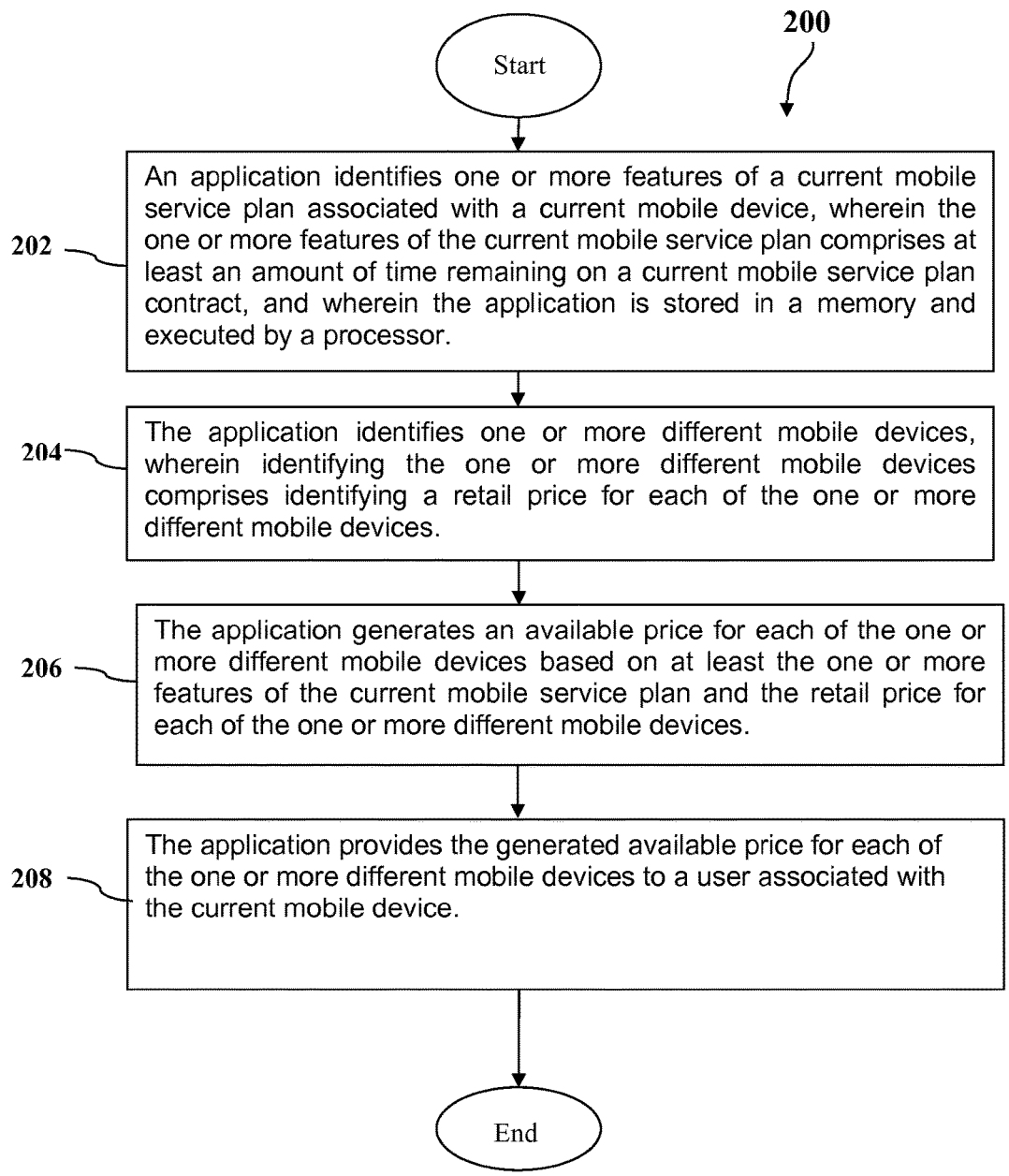
FIG. 2 is a flow chart of a method according to an embodiment of the disclosure.

In FIG. 2, a method 200 is described. At block 202, an application 46 identifies one or more features of a current mobile service plan associated with a current mobile device 12a, wherein the one or more features of the current mobile service plan comprises at least an amount of time remaining on a current mobile service plan contract, and wherein the application 46 is stored in a memory and executed by a processor.

At block 204, the application 46 identifies one or more different mobile devices 12b, wherein identifying the one or more different mobile devices 12b comprises identifying a retail price for each of the one or more different mobile devices 12b.

At block 206, the application 46 generates an available price for each of the one or more different mobile devices 12b based on at least the one or more features of the current mobile service plan and the retail price for each of the one or more different mobile devices 12b. It is understood that the available price may be a discounted price relative to the retail price.

At block 208, the application 46 provides the generated available price for each of the one or more different mobile devices 12b to a user associated with the current mobile device 12a. In an embodiment, providing the generated available price for each of the one or more different mobile devices 12b to the user associated with the current mobile device 12a may comprise providing the generated available price for each of the one or more different mobile devices 12b to at least one of the current mobile device 12a, an email address of the user associated with the current mobile device 12a, one or more other mobile devices of the user associated with the current mobile device 12a, and/or a server to update a mobile device user account.

In an embodiment, the method 200 may further comprise that the application 46 evaluates a usage history of the user associated with the current mobile device 12a and generates the available price for each of the one or more different mobile devices 12b based on at least the usage history of the user associated with the current mobile device 12a. In an embodiment, the method 200 may further comprise that the application 46 identifies one or more features of the current mobile device 12a and generates the available price for each of the one or more different mobile devices 12b based on at least the one or more features of the current mobile device 12a. In an embodiment, the method 200 may further comprise identifying one or more different service plans associated with the one or more different mobile devices 12b and generating the available price for each of the one or more different mobile devices 12b based at least on the one or more different service plans. In an embodiment, the method 200 may also comprise identifying one or more days remaining in a current mobile communication service plan contract and generating the available price for each of the one or more different mobile devices 12b based on at least the one or more days remaining in the current mobile communication service plan contract. In an embodiment, the method 200 may further comprise identifying a current mobile device value and/or refurbish value and generating the available price for each of the one or more different mobile devices 12b based on at least the current mobile device value and/or refurbish value.

In an embodiment, the method 200 may further comprise that the application 46 receives a selection of at least one of the one or more different mobile devices 12b in response to providing the generated available price of each of the one or more different mobile devices 12b to a user associated with the current mobile device 12a. In an embodiment, the method 200 may comprise that the application 46 transmits a request to a server to initiate delivery of at least the selected different mobile device 12b of the one or more different mobile devices 12b.

Figure 3:
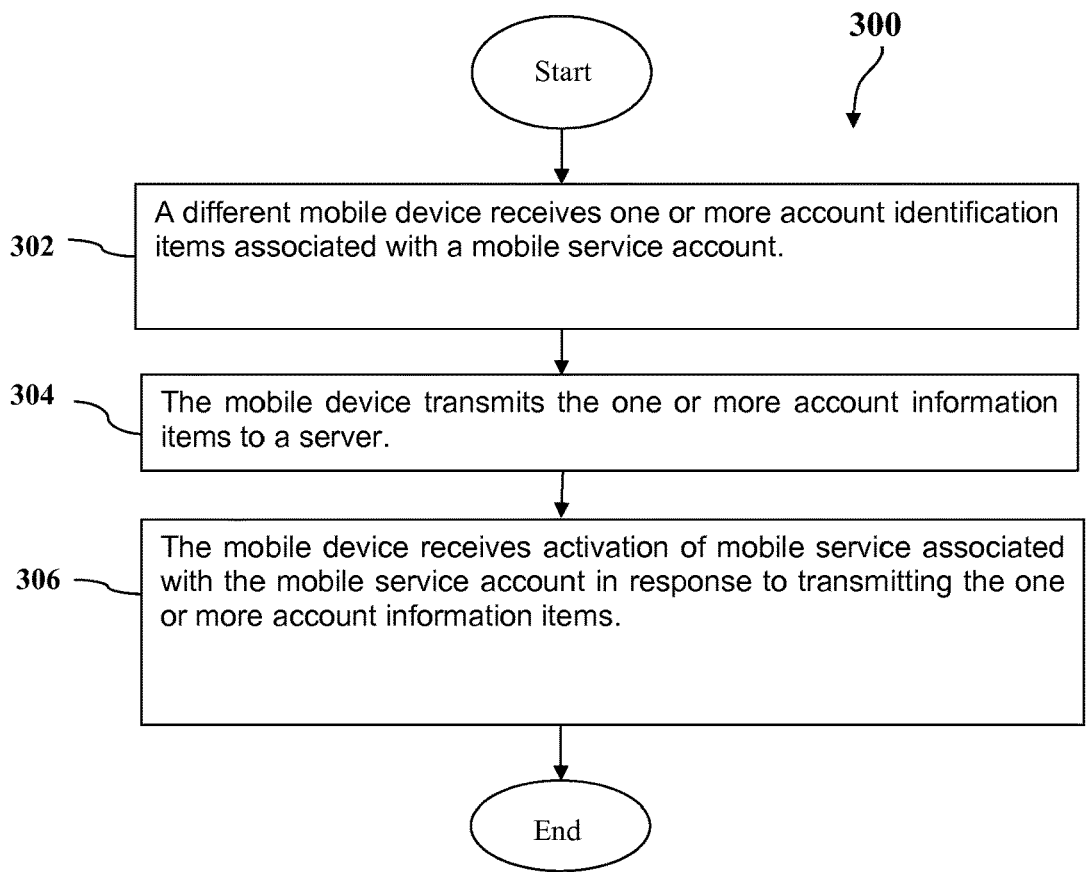
FIG. 3 is a flow chart of a method according to an embodiment of the disclosure.

In FIG. 3, a method 300 is described. At block 302, a different mobile device 12b receives one or more account identification items associated with a mobile service account. At block 304, the mobile device 12b transmits the one or more account information items to a server. At block 306, the mobile device 12b receives activation of mobile service associated with the mobile service account in response to transmitting the one or more account information items.

In an embodiment, the method 300 may further comprise deactivating mobile service associated with the mobile service account on an initial mobile device 12a in response to transmitting the one or more account information items. In an embodiment, the deactivated mobile service on the initial mobile device 12a is under a different mobile service plan contract than the activated mobile service on the different mobile device 12b.

In an embodiment, the method 300 may further comprise that the one or more account information items comprises an account identification number, an account username, an account password, a phone number of an initial mobile device 12a, an address of the mobile device owner and/or user, an answer to one or more security questions, a unique identifier associated with only the initial mobile device 12a, and/or a unique identifier associated with only the different mobile device 12b.

Figure 4:
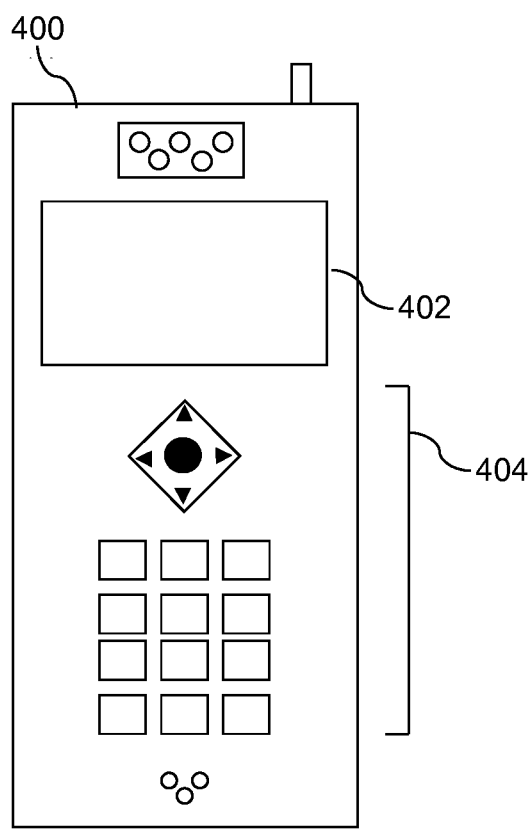
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
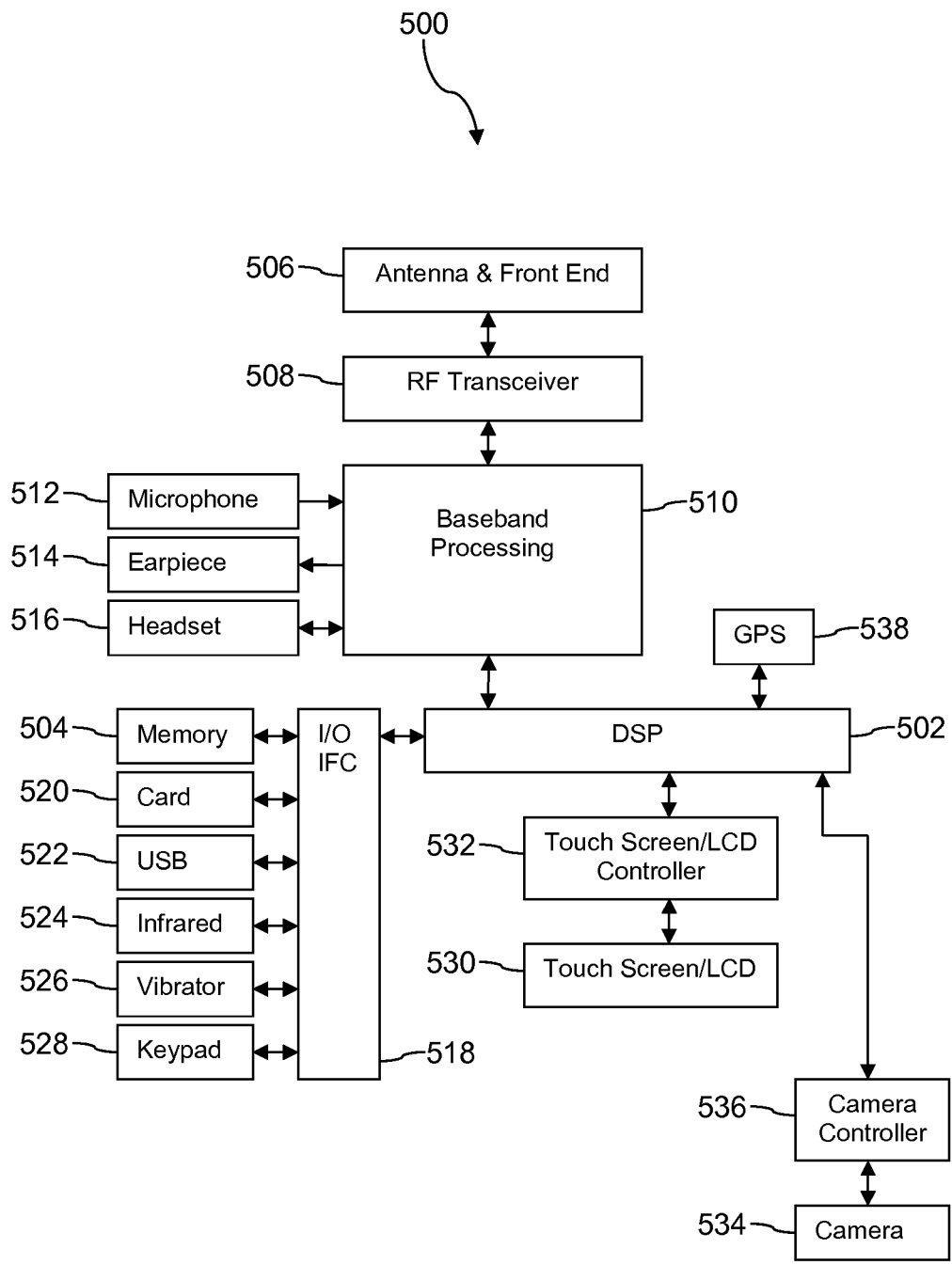
FIG. 5 is a block diagram of a mobile device according to an embodiment of the disclosure.

FIG. 5 shows a block diagram of the mobile device 500. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
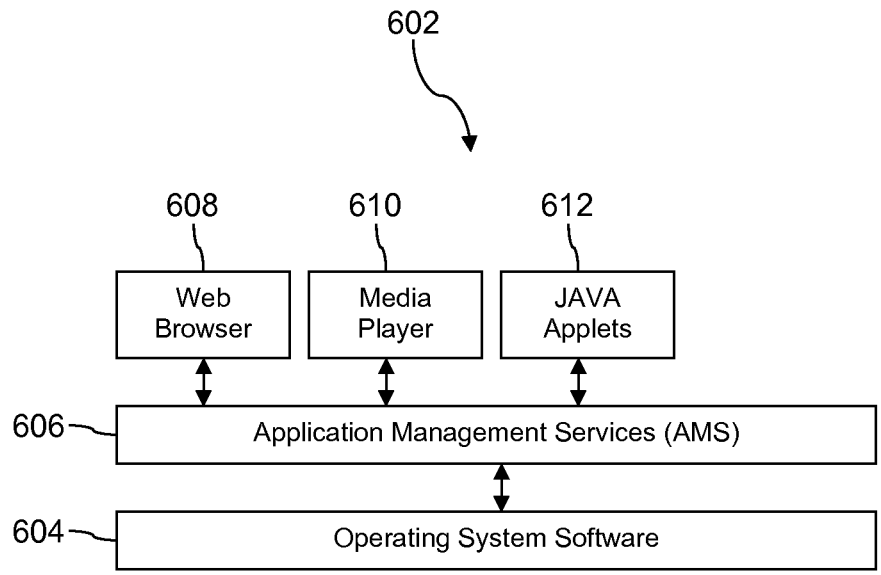
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
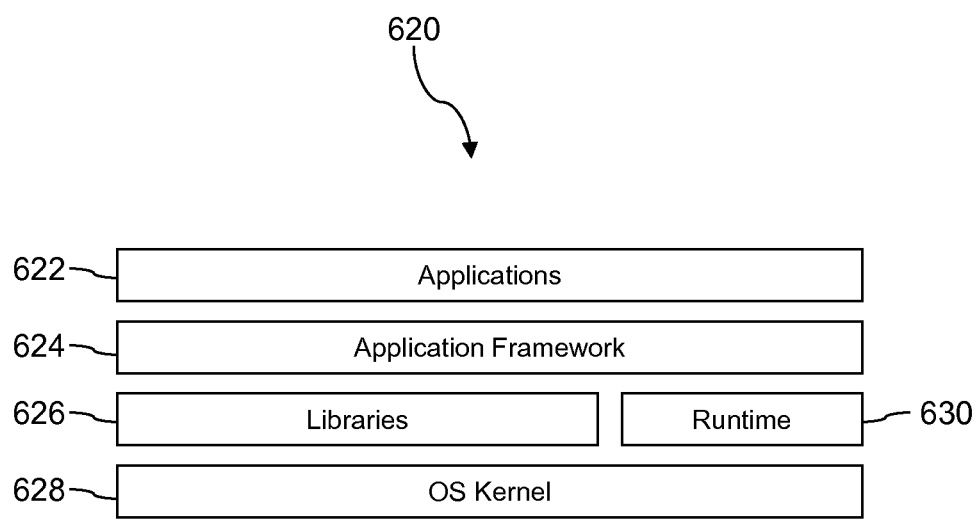

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
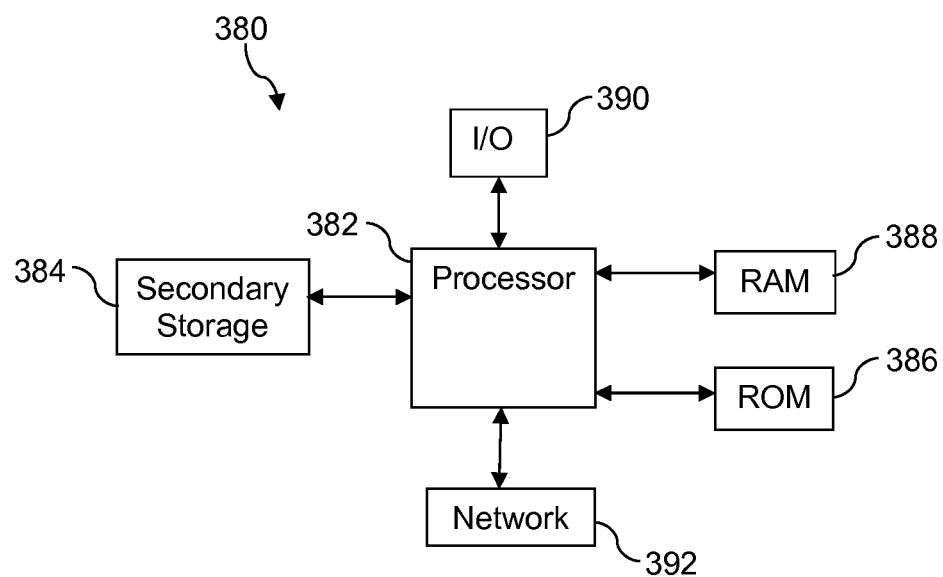
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for enabling selection of one or more different mobile devices for delivery, comprising:
    a server comprising:
        a processor;
        a non-transitory memory; and
        a server application stored in the non-transitory memory of the server that, when executed by the processor of the server, configures the processor of the server to:
            trigger a mobile device application to run a diagnostics test on a current mobile device by sending a signal to the current mobile device;
    the current mobile device comprising:
        a processor;
        a non-transitory memory; and
        the mobile device application stored in the non-transitory memory of the current mobile device that, when executed by the processor of the current mobile device, configures the processor of the mobile device to:
            run the diagnostics test on the current mobile device in response to receiving the signal from the server application, wherein the diagnostics test comprises the mobile device application examining a processing capacity of the processor of the current mobile device and whether one or more viruses are present in the current mobile device, and
            send a message to the server application indicating results of the diagnostics test,
    wherein the server application is further configured to:
        receive the message from the mobile device application indicating the results of the diagnostics test,
        determine a refurbished value of the current mobile device based on the results of the diagnostics test,
        identify one or more characteristics associated with the current mobile device, the one or more characteristics selected from a group consisting of: one or more features of a current mobile service plan associated with the current mobile device comprising at least an amount of time remaining on a contract corresponding to the current mobile service plan, one or more features of the current mobile device, and a usage history of a user of the current mobile device, identify the one or more different mobile devices, wherein identifying the one or more different mobile devices comprises identifying a retail price for each of the one or more different mobile devices, generate an available price for each of the one or more different mobile devices based on the one or more characteristics associated with the current mobile device, the refurbished value of the current mobile device, and the retail price for each of the one or more different mobile devices, wherein the available price for each of the one or more different mobile devices varies depending on the amount of time remaining on the contract with a higher available price when there is more time remaining on the contract and a lower available price when there is less time remaining on the contract, provide the generated available price for each of the one or more different mobile devices to a display associated with a user associated with the current mobile device, receive user input from the user associated with the current mobile device that indicates a selection of at least one of the one or more different mobile devices, transmit a request to a server of a mobile service provider associated with the current mobile service plan, the request indicating the selection of the at least one of the one or more different mobile devices by the user of the current mobile device, and in response to receiving the request, initiate, via the server of the mobile service provider associated with the current mobile service plan, delivery of the at least one of the one or more different mobile devices to an address associated with the user associated with the current mobile device, and the at least one or more different mobile devices comprising:

a processor;

a non-transitory memory; and a transfer application stored in the non-transitory memory of the at least one or more different mobile devices that, when executed by the processor of the at least one or more different mobile devices, configures the processor of the mobile device to:

automatically activate the transfer application responsive to the at least one or more different mobile devices being powered on, receive one or more account identification items uniquely associated with a mobile service account of the current mobile service plan of the current mobile device, transmit the one or more account information items to a second server of the mobile service provider, and automatically receive activation of mobile service associated with the mobile service account in response to transmitting the one or more account information items, wherein transmitting the one or more account information causes the second server of the mobile service provider to transmit a signal to deactivate the current mobile device automatically in response to receipt of the one or more account information items and activation of the mobile service associated with the mobile service account on the at least one or more different mobile devices.

2. The system of claim 1, wherein the usage history comprises at least one of a duration of time receiving service from the mobile service provider associated with the current mobile service plan, an amount of revenue generated from mobile service usage by the current mobile device, a number of other mobile devices associated with the user of the current mobile device, or a number of mobile service plan contract renewals with the mobile service provider by the user of the current mobile device.

3. The system of claim 1, wherein the one or more features of the current mobile service plan further comprise at least one of a total current mobile service plan contract duration, a quantity of talk minutes available per month on the current mobile service plan, a number of other mobile devices associated with the current mobile service plan, a revenue generated through the current mobile service plan, or a quantity of data permitted for data transmission per month with the current mobile service plan.

4. The system of claim 1, wherein the server application identifies one or more different service plans associated with the one or more different mobile devices.

5. The system of claim 4, wherein the generated available price for each of the one or more different mobile devices is further based on the identified one or more different service plans.

6. The system of claim 1, wherein the one or more features of the current mobile device comprise at least one of a current mobile device age, a current mobile device type, a current mobile device model, a previous purchase price of the current mobile device, a current functionality of the current mobile device, a damage history of the current mobile device, or one or more service requests associated with the current mobile device.

7. The system of claim 1, wherein at least one of the one or more different mobile devices is an upgraded mobile device, and wherein the upgraded mobile device comprises at least one mobile device feature different from the features of the current mobile device.

8. The system of claim 1, wherein the available price is less than the retail price for at least one of the one or more different mobile devices.

9. The system of claim 1, wherein the diagnostics test further comprises the mobile device application examining an output of one or more sensors that indicate an occurrence of tampering with the current mobile device.

10. A method of enabling selection of one or more different mobile devices for delivery, comprising:

triggering, by a server application stored in a non-transitory memory of a server and executed by a processor of the server, a mobile device application to run a diagnostics test on a current mobile device by sending a signal to the current mobile device;

running, by the mobile application stored in a non-transitory memory of the current mobile device and executed by a processor of the current mobile device, the diagnostics test on the current mobile device in response to receiving the signal from the server application, wherein the diagnostics test comprises the mobile device application examining a processing capacity of the processor of the current mobile device and whether one or more viruses are present in the current mobile device;

sending, by the mobile application, a message to the server application indicating results of the diagnostics test;

receiving, by the server application, the message from the mobile device application indicating the results of the diagnostics test;

determining, by the server application, a refurbished value of the current mobile device based on the results of the diagnostics test;

identifying, by the server application, one or more characteristics associated with the current mobile device, the one or more characteristics selected from a group consisting of: one or more features of a current mobile service plan associated with the current mobile device comprising at least an amount of time remaining on a current mobile service plan contract, one or more features of the current mobile device, and a usage history of a user of the current mobile device;

identifying, by the server application, the one or more different mobile devices, wherein identifying the one or more different mobile devices comprises identifying a retail price for each of the one or more different mobile devices;

generating, by the server application, an available price for each of the one or more different mobile devices based on the one or more characteristics associated with the current mobile device, the refurbished value of the current mobile device, and the retail price for each of the one or more different mobile devices, wherein the available price for each of the one or more different mobile devices varies depending on the amount of time remaining on the contract with a higher available price when there is more time remaining on the contract and a lower available price when there is less time remaining on the contract;

providing, by the server application, the generated available price for each of the one or more different mobile devices to a display associated with a user associated with the current mobile device;

receiving, by the server application, user input from the user associated with the current mobile device that indicates a selection of at least one of the one or more different mobile devices and an acceptance of the available price for the at least one of the one or more different mobile devices;

transmitting, by the server application, a request to a server of a mobile service provider associated with the current mobile service plan, the request indicating the selection of the at least one of the one or more different mobile devices by the user of the current mobile device;

in response to receiving the request indicating the selection, initiating, by the server of the mobile service provider associated with the current mobile service plan, delivery of the at least one of the one or more different mobile devices to an address associated with the user associated with the current mobile device;

automatically activating a transfer application of the at least one of the one or more different mobile devices responsive to the at least one of the one or more different mobile devices being powered on;

receiving, by a transfer application of the at least one of the one or more different mobile devices, one or more account identification items uniquely associated with a mobile service account of the current mobile service plan of the current mobile device;

transmitting, by the transfer application, the one or more account information items to a second server of the mobile service provider; and automatically receiving, by the at least one of the one or more different mobile devices, activation of mobile service associated with the mobile service account in response to transmitting the one or more account information items, wherein transmitting the one or more account information causes the second server of the mobile service provider to transmit a signal to deactivate the current mobile device automatically in response to receipt of the one or more account information items and activation of the mobile service associated with the mobile service account on the at least one or more different mobile devices.

11. The method of claim 10, further comprising identifying one or more different service plans associated with the one or more different mobile devices, wherein generating the available price for each of the one or more different mobile devices is further based on the one or more different service plans.

12. The method of claim 10, wherein providing the generated available price for each of the one or more different mobile devices to the display associated with the user associated with the current mobile device comprises providing the generated available price for each of the one or more different mobile devices to at least one of the current mobile device, an email address of the user associated with the current mobile device, one or more other mobile devices of the user associated with the current mobile device, or a server to update a mobile device user account.

13. A method of transferring mobile service between mobile devices, the method comprising:

triggering, by a server application stored in a non-transitory memory of a server and executed by a processor of the server, a mobile device application to run a diagnostics test on a current mobile device by sending a signal to the current mobile device;

running, by the mobile application stored in a non-transitory memory of the current mobile device and executed by a processor of the current mobile device, the diagnostics test on the current mobile device in response to receiving the signal from the server application, wherein the diagnostics test comprises the mobile device application examining a processing capacity of the processor of the current mobile device and whether one or more viruses are present in the current mobile device;

sending, by the mobile application, a message to the server application indicating results of the diagnostics test;

receiving, by the server application, the message from the mobile device application indicating the results of the diagnostics test;

determining, by the server application, a refurbished value of the current mobile device based on the results of the diagnostics test;

identifying, by the server application, one or more characteristics associated with the current mobile device;

identifying, by the server application, one or more different mobile devices, wherein identifying the one or more different mobile devices comprises identifying a retail price for each of the one or more different mobile devices;

generating, by the server application, an available price for each of the one or more different mobile devices based on the one or more characteristics associated with the current mobile device and the retail price for each of the one or more different mobile devices;

providing, by the server application, the generated available price for each of the one or more different mobile devices to a display associated with a user associated with the current mobile device;

receiving, by the server application, user input from the user associated with the current mobile device that indicates a selection of at least one of the one or more different mobile devices;

transmitting, by the server application, a request to a first server of a mobile service provider associated with a current mobile service plan of the current mobile device, the request indicating the selection of the at least one of the one or more different mobile devices by the user of the current mobile device;

in response to receiving the request, initiating, by the first server of the mobile service provider associated with the current mobile service plan, delivery of the at least one of the one or more different mobile devices to an address associated with the user associated with the current mobile device;

automatically activating a transfer application of the at least one of the one or more different mobile devices responsive to the at least one of the one or more different mobile devices being powered on;

receiving, by a transfer application of the at least one of the one or more different mobile devices, one or more account identification items uniquely associated with a mobile service account of the current mobile service plan of the current mobile device;

transmitting, by the transfer application of the at least one of the one or more different mobile devices, the one or more account information items to a second server of the mobile service provider; and automatically receiving, by the at least one of the one or more different mobile devices, activation of mobile service associated with the mobile service account in response to transmitting the one or more account information items, wherein transmitting the one or more account information causes the second server of the mobile service provider to transmit a signal to deactivate the current mobile device in response to receipt of the one or more account information items and activation of the mobile service associated with the mobile service account on the at least one or more different mobile devices.

14. The method of claim 13, wherein the deactivated mobile service on the current mobile device is under a different mobile service plan contract than the activated mobile service on the one or more different mobile devices.

15. The method of claim 13, wherein the one or more account information items comprises at least one of an account identification number, an account username, an account password, a phone number of an initial mobile device, an address of the mobile device owner and/or user, an answer to one or more security questions, a unique identifier associated with only the initial mobile device, or a unique identifier associated with only the mobile device.

* * * * *